US008444024B2

(12) United States Patent
Kakuta et al.

(10) Patent No.: US 8,444,024 B2
(45) Date of Patent: May 21, 2013

(54) HEAD PART MODULE OF A DISCHARGE PUMP FOR A DISCHARGE CONTAINER AND A DISCHARGE PUMP COMPRISING A HEAD PART MODULE AND A PUMP PART MODULE

(75) Inventors: Yoshiyuki Kakuta, Tokyo (JP); Shigeo Iizuka, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 157 days.

(21) Appl. No.: 12/997,759

(22) PCT Filed: Sep. 28, 2009

(86) PCT No.: PCT/JP2009/066808
§ 371 (c)(1),
(2), (4) Date: Dec. 13, 2010

(87) PCT Pub. No.: WO2010/038705
PCT Pub. Date: Apr. 8, 2010

(65) Prior Publication Data

US 2011/0095055 A1 Apr. 28, 2011

(30) Foreign Application Priority Data

| | | |
|---|---|---|
| Sep. 30, 2008 | (JP) | 2008-255669 |
| Jun. 30, 2009 | (JP) | 2009-156428 |
| Aug. 31, 2009 | (JP) | 2009-201098 |

(51) Int. Cl.
*G01F 11/00* (2006.01)

(52) U.S. Cl.
USPC ................ 222/321.9; 222/153.13; 222/321.7; 222/380

(58) Field of Classification Search
USPC .............. 222/321.7, 321.9, 385, 380, 153.09, 222/153.13, 321.3
See application file for complete search history.

(56) References Cited

U.S. PATENT DOCUMENTS 3,120,328 A 2/1964 Corsette et al.
4,022,354 A * 5/1977 Kotuby ...................... 222/321.2

(Continued)

FOREIGN PATENT DOCUMENTS

| | | |
|---|---|---|
| JP | U-05-044247 | 6/1993 |
| JP | A-10-053269 | 2/1998 |
| JP | A-2002-159891 | 6/2002 |
| JP | A-2003-292006 | 10/2003 |
| JP | B2-3657378 | 6/2005 |
| JP | A-2010-083554 | 4/2010 |

OTHER PUBLICATIONS

International Search Report issued in Application No. PCT/JP2009/066808; Dated Jan. 12, 2010 (With Translation).
Office Action issued in Korean Patent Application No. 10-2010-7028800 dated Sep. 19, 2012 (with translation).
Nov. 9, 2012 Office Action issued in Canadian Patent Application No. 2,730,563.

*Primary Examiner* — Frederick C Nicolas
(74) *Attorney, Agent, or Firm* — Oliff & Berridge, PLC

(57) ABSTRACT

A head part module of a discharge pump for a discharge container, in which the head part of the pump mechanism can be readily varied. A head part module of a discharge pump includes a mounting cap having a link cylinder upwardly extending via an inward flange from an upper end of a mounting cylinder: a cover ring having a top plate with a through hole in the middle part thereof, an outer wall hanging from an outer circumference of the top plate, a first fitting strip and a second fitting strip circumferentially provided on the rear face of the top plate, a top part of the link cylinder, being loosely fitted into the second fitting strip; and a push down head having an outer cylinder hanging from an outer circumference of a top plate a first communication tube hanging from a rear face of the top plate above the through hole and a nozzle forwardly projecting from the outer cylinder, the outer cylinder being fitted onto an outer face of the outer wall.

12 Claims, 14 Drawing Sheets

U.S. PATENT DOCUMENTS 4,317,531 A * 3/1982 Saito et al. ................. 222/321.2
4,516,727 A * 5/1985 Saito et al. .................... 239/333
5,064,102 A * 11/1991 Montaner ..................... 222/147
5,549,223 A * 8/1996 Hori ......................... 222/153.13
6,119,902 A * 9/2000 Shimada et al. ........... 222/321.3
6,308,865 B1 * 10/2001 Lin .......................... 222/153.13
6,702,156 B2 * 3/2004 Shimada et al. ........... 222/321.7

* cited by examiner

HEAD PART MODULE OF A DISCHARGE PUMP FOR A DISCHARGE CONTAINER AND A DISCHARGE PUMP COMPRISING A HEAD PART MODULE AND A PUMP PART MODULE

TECHNICAL FIELD

The present invention relates to a head part module of a discharge pump for a discharge container and a discharge pump comprising a head part module and a pump part module.

RELATED ART

Conventionally, a pumping mechanism for a liquid discharge container is known, in which a stem extends upwardly from a pump cylinder having a collar on an upper end part, and a push down head with a nozzle is arranged upon the stem, The pumping mechanism is further provided with a mounting cap having an inward flange for clamping the collar with an upper end is face of a cylindrical part, and a cover ring covering an area between the upper part of the stem and the inward flange. (see Patent Document 1)

Patent Document 1: JP 3657378 B

DISCLOSURE OF THE INVENTION

Since the liquid discharge pump disclosed in Patent Document 1 has a mechanism in which a stem of the pump part has to be inserted into the mounting cap before mounting the cover ring to form a pump, it is required to change the whole structure from the pump part to the head part to vary the form of the head part including mounting cap and nozzle head, In order to solve such conventional problems, the applicant of this invention has suggested in Japanese Patent Application No. 2008-255669 that different parts of the discharge pump except the pumping mechanism, i.e., the mounting cap, the cover ring and the push down head are coupled to form a module (head part module), and the link is disconnected after the head part module is combined with the pump part module. However, it is more preferable if the disconnecting operation can be omitted.

The first object of the invention is to provide a head part module of a discharge pump for a discharge container, in which the head part of the pump mechanism can be readily varied.

The second object of the invention is to provide a head part module, which can be readily attached to the container body without disconnecting the link of respective parts of the head part module.

The third object of the invention is to provide a discharge pump comprising the above described head part module and the pump part module.

The first embodiment of the present invention is a head part module consisting, together with a pump part module for mounting on a container body, of a discharge pump, the head part module comprising:

- a mounting cap 4 having a link cylinder 10 upwardly extending from an upper end of a mounting cylinder 6 via an inward flange 8 for fitting onto an outer face of a neck portion of the container body;
- a cover ring 16 having a top plate 18 with a through hole 20 in the middle part thereof, an outer wall 24 hanging from an outer circumference of the top plate 18 and an internal first fitting strip 28 as well as an external second fitting strip 30 circumferentially provided on the rear face of the top plate 18, the link cylinder 10 being rotatably fitted into the second fitting strip 30; and
- a push down head 37 having an outer cylinder 40 hanging from an outer circumference of a top plate 38, a first communication tube 42 hanging from a rear face of the top plate 38 above the through hole 20 and a nozzle 44 forwardly projecting from the outer cylinder 40, the outer cylinder 40 being detachably fitted onto an outer face of the outer wall 24;
- wherein the first fitting strip 28 of the cover ring 16 can be fitted onto an upper end of a pump cylinder of the pump part module, and a first communication tube 42 of the push down head 37 is fitted onto the second communication tube serving also as a stem of the pump part module, respectively, by pushing down the head part module.

In this embodiment, it is provided that the discharge pump is divided into a pump part and a head part, and that three elements of the head part, i.e., the mounting cap, the cover ring and the push down head are modularized. Throughout this description, the term "module" indicates a detachable, separate structural unit, and the "head part" is a top part of the discharge pump when the discharge pump is attached to the container body. While the "pump part" has one function as a whole, each component of the "head part" has a different function. In other words, closely arranged parts in a mounted state are linked with each other despite the difference of their function. With this characteristic, if parts associated with the pump part module such as the first communication tube and the fitting strips (grooves) are correspondingly dimensioned and arranged, other parts can be freely designed. In this regard, further description is given below.

The "cover ring" has a first fitting strip as well as a second fitting strip on the rear face and is linked with a mounting ring via the link cylinder which is fitted into the second fitting strip in a modularized state. The fitting strip is a fitting part extending in a direction (circumferential direction) and can be formed by a circumferential face of a cylinder wall, or formed as a concave.

The "mounting cap" has a link cylinder upwardly extending via an inward flange from a mounting cylinder for fitting onto (a thread engagement with) a neck portion of the container body. The link cylinder is loosely and rotatably fitted into the second fitting strip 30, so that the mounting cylinder can be attached to the neck portion of the container body without releasing the link.

The second aspect is based on the first aspect, and the first fitting strip 28 and the second fitting strip 30 are formed as inner and outer fitting strip grooves which are divided by a middle wall 26 hanging from the rear face of the top face 18, and a second engagement strip 34 and a first engagement strip 11 are circumferentially provided on opposing circumferential faces of the second fitting strip 30 and the link cylinder 10 to prevent removal of the link cylinder 10 by a mutual engagement.

In this aspect, a fitting strip groove (inner groove) for attaching the pump part module is circumferentially provided on the inner side of the top plate of the cover ring in the head part module. Thus, two modules can be securely joined. Another fitting strip groove (outer groove) is circumferentially provided on the outer side of the top plate of the cover ring. The link cylinder of the mounting cap is fitted onto an outer face or an inner face of the fitting strip groove. For "engagement strip", a convex engagement strip can be combined with a convex engagement strip, or a convex engagement strip can be combined with a concave engagement strip.

The third aspect is based on the second aspect, and a longitudinal cylinder 33 with a larger inner diameter than that of the outer wall 24 is hanging from a lower end of the outer wall 24 and a second fitting strip 30 is defined by respective inner faces of the outer wall 24 and the longitudinal cylinder 33 as well as an outer face of the middle wall, and an upper part of the link cylinder 10 is fitted onto the inner face of the outer wall 24 in a manner that it can slide in a circumferential direction, and the second engagement strip 34 and the first engagement strip 11 are formed on a lower part of the link cylinder 10 and the longitudinal cylinder 33, so that they can engage with each other to lock the link cylinder 10.

In this aspect, the link cylinder of the mounting cap is divided into an upper part having an effect for sliding in a circumferential direction against the outer wall, and a lower part having an effect for a locking engagement with the longitudinal cylinder, so that each effect can be properly exerted. In a preferred embodiment in FIG. 1, degrees of freedom for a movement of the link cylinder are not only given in a circumferential direction but also in a vertical direction, so that the mounting cylinder can be attached to the neck portion in the same way as the structure without the link cylinder.

The fourth aspect is based on the second aspect, and a diameter-enlarged cylinder 25 is hanging from the lower end of the outer wall 24 via an outward flange 25*a*; the second fitting strip 30 is defined by respective inner faces of the outer wall 24 and the diameter-enlarged cylinder 25 as well as the outer face of the middle wall 26; the link cylinder 10 is formed as a double cylinder comprising an inner cylinder 10A fitted onto the inner face of the outer wall 24 and an outer cylinder 10B fitted onto the inner face of the diameter-enlarged cylinder 25; and the second engagement strip 34 and the first engagement strip 11 are formed on the outer cylinder 10B and the diameter-enlarged cylinder 25, respectively, so that they can engage with each other to lock the link cylinder 10.

In this aspect, it is provided that the link cylinder is formed as a double cylinder comprising an inner cylinder and an outer cylinder. The inner cylinder and the outer cylinder are fitted into the guide ring, respectively, so that the mounting cap can be securely mounted on the guide ring.

The fifth aspect is based on the first aspect, and the double cylinder with the inner cylinder and the outer cylinder is hanging from the lower part of the outer wall 24 of the cover ring 16, and the second fitting strip 30 is formed in the double cylinder as a fitting groove defined by the inner faces of the double cylinder instead of being formed on the rear face of the top face 18 of the cover ring 16.

In this aspect, it is provided that the fitting groove as a second fitting strip is formed in the double cylinder hanging from the outer wall of the cover ring, as shown in FIG. 10. Thus, the same effect and result as those of the first aspect can be obtained by the structure in which the second fitting strip is arranged at a distance from the top plate.

The sixth aspect is based on the first aspect, and the second fitting strip 30 is formed as a fitting convex strip downwardly extending from the lower part of the outer wall instead of being formed on the rear face of the top plate 18 of the cover ring 16.

In this aspect, it is provided that the second fitting strip is formed as a fitting convex strip downwardly extending from the lower part of the outer wall, as shown in FIG. 12 and FIG. 14. In the shown example, the fitting convex strip is a projected annular strip (longitudinal cylinder) downwardly extending from the lower end of the outer wall, it is also possible to provide a plurality of projected fitting pieces arranged discontinuously in a circumferential direction of the outer wall.

The seventh aspect is a discharge pump comprising a pump part module for mounting on a container body and a head part module according to any one of the first to sixth aspects, the pump part module comprising:

- a pump cylinder 52 having a collar 58 projecting from an outer face of an upper part of a circumferential wall for inserting into the container body;
- a tubular member 64 having a second communication tube 68 serving also as a stem of the pump part module and upwardly extending from a cylindrical piston 66 sliding within the pump cylinder 52;
- a suction valve 54 formed on a lower part of the pump cylinder 52; and
- a discharge valve 72 formed on an upper part of the second communication tube 68;
- wherein a cylindrical wall part adjacent above the collar and an upper end of the second communication tube 68 are formed substantially cylindrical as an insertion area into the head part module, so that the piston 66 is not removed from the pump cylinder 52 and pumping function is fulfilled by the module alone.

In this aspect, as shown in FIG. 7, a discharge pump comprising a pump part module and a head part module is provided. "Pump part" here includes at least a pump cylinder and a piston, and comprises a communication tube serving also as a stem and upwardly extending from the piston. In the preferred embodiment shown in FIG. 7, the mounting cylinder can be attached to the neck portion of the container body without the engagement between the first engagement strip and the second engagement strip to be released.

EFFECT OF THE INVENTION

The following effect can be obtained by the invention according to the first aspect. Firstly, three parts of the discharge pump, i.e., the mounting cap, the cover ring and the push down head are modularized as a head part, so that the form of the head part can be designed independently from the structure of the pump. As a result, design can be readily changed and it is easy to produce correspondingly a variety of products in a small amount. Secondly, the mounting cap and the cover ring are linked by the link cylinder, so that modularization can be realized with a simple structure. Thirdly, the link cylinder can be rotated relative to the cover ring, so that the mounting cylinder can be readily mounted on the neck portion of the container while the link with the cover ring is retained.

In the invention according to the second aspect, the first engagement strip 11 and the second engagement strip 34 are circumferentially provided on the second fitting strip 30 and the link cylinder 10, respectively, so that removal of the link cylinder can be securely prevented.

In the invention according to the third aspect, the upper part of the link cylinder 10 is fitted onto the outer wall 24, so that it can slide in a circumferential direction, and thus, the cover ring can be stably rotated relative to the mounting cap 4.

In the invention according to the fourth aspect, the link cylinder 10 is formed as a double cylinder with inner and outer cylinders and fitted into the guide ring, so that the guide ring can be steadily mounted on the mounting cap.

In the invention according to the fifth aspect, the second fitting strip 30 is formed in the double cylinder hanging from the outer wall, so that the same effect as the first aspect can be obtained.

In the invention according to the sixth aspect, the second fitting strip 30 is formed as a fitting convex strip downwardly handing from the outer wall, so that the same effect as the first aspect can be obtained.

In the invention according to the seventh aspect, the pump part consisting of the pump cylinder and the tubular member in the pump mechanism is modularized to provide a function as a pump, so that the pump part module can be manufactured separately and a quality test can be performed. Thus, efforts required for manufacturing process is considerably reduced.

BEST MODE FOR CARRYING OUT THE INVENTION

A head part module, a pump part module and a discharge pump formed by the both modules according to the first embodiment of the invention will be described below with reference to the accompanying drawings.

Figure 1:
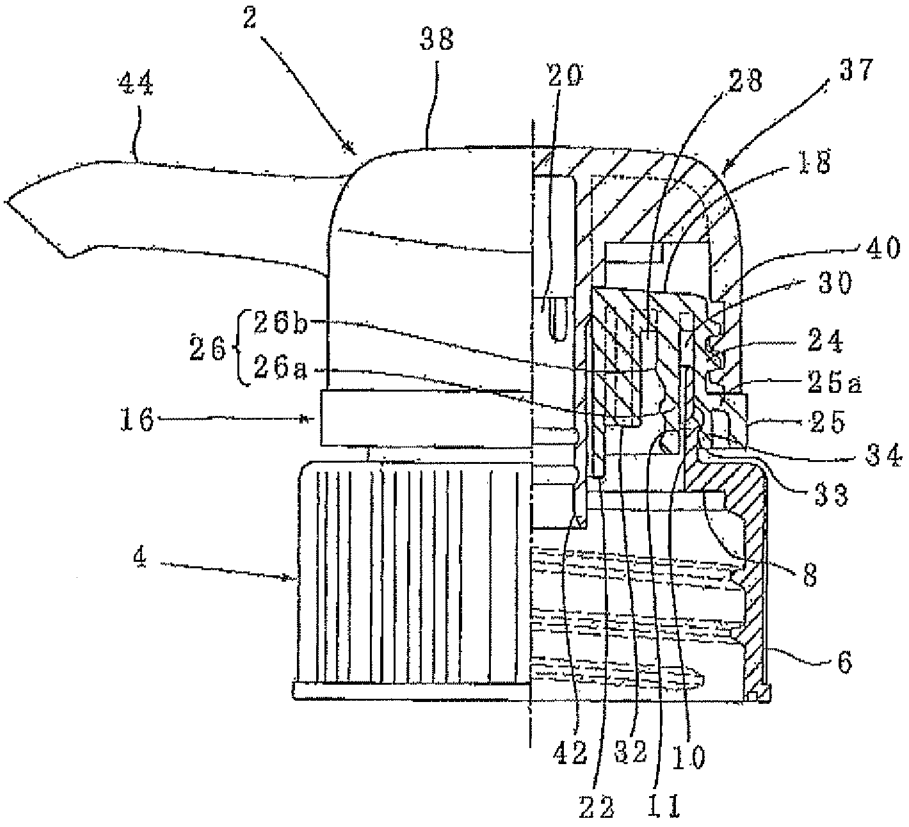
FIG. 1 is a longitudinal sectional view of a head part module according to the first embodiment of the invention.
Figure 2:
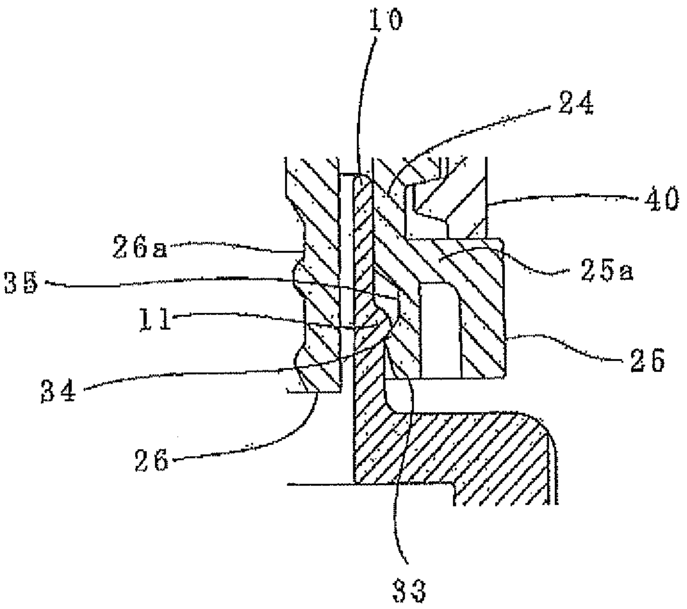
FIG. 2 is a partially enlarged view of the head part module in FIG. 1.
Figure 3:
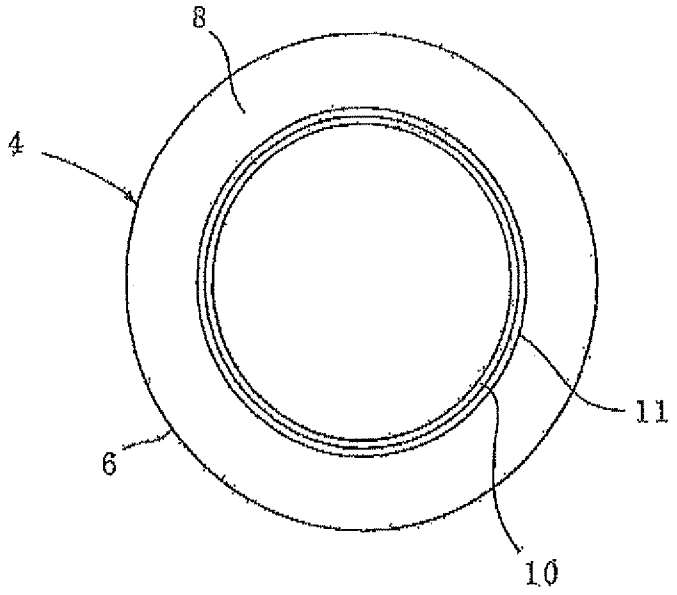
FIG. 3 is a top view of a main part of a mounting cap in FIG. 1.

FIGS. 1 to 5 show the structure of the head part module. As shown in FIG. 1, the head part module 2 comprises a mounting cap 4, cover ring 16 and a push down head 37. Each of these parts can be composed of the synthetic resin.

Figure 4:
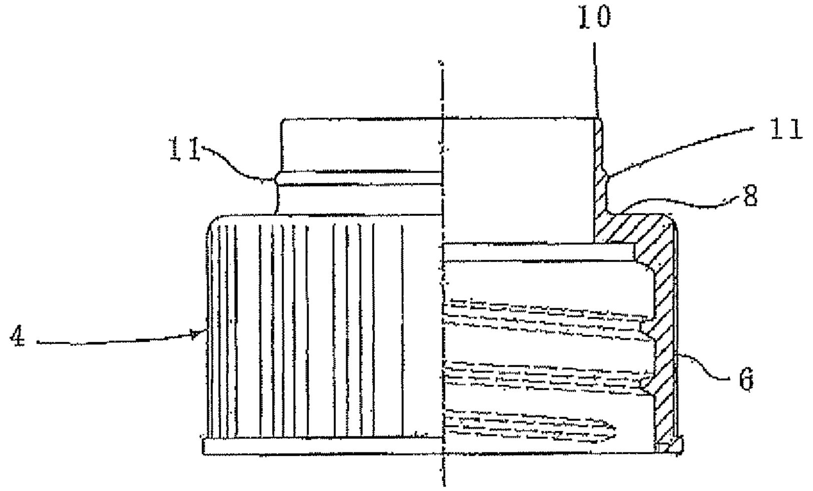
FIG. 4 is a longitudinal sectional view of the head part module in FIG. 3.

As shown in FIG. 4, the mounting cap 4 comprises a mounting cylinder 6 for thread engagement with an outer face of a neck portion of a container body, an inward flange 8 provided on an upper end of the mounding cylinder 6 and a link cylinder 10 upwardly extending from an inner edge of the inward flange 8. The link cylinder 10 has a first engagement strip 11 for linking (connecting) the mounting cylinder 6 with a cover ring which will be described below. The term "link" as used herein means that at least the mounting cap and the cover ring are connected to each other, and includes a structure in which both members can be rotated and moved up and down.

In the shown example in FIG. 4, an upper half of the link cylinder 10 has a larger outer diameter than a lower half of the cylinder, and the convex first engagement strip 11 is provided between outer surfaces of the lower half and the upper half of the cylinder. However, this structure can be varied appropriately.

Figure 5:
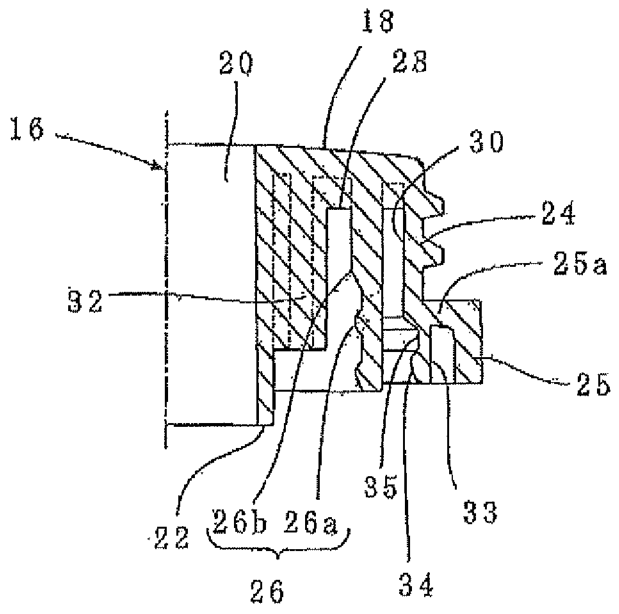
FIG. 5 is a longitudinal sectional view of a cover ring in FIG. 1.

As shown in FIG. 5, the cover ring 16 has a ring-like top plate 18 having a through hole 20 opened in the middle part thereof. In the shown example, an inner wall 22 with a long leg and an outer wall 24 with a short leg are hanging downwardly from an inner edge and an outer edge of the top plate 18, respectively. The entire inner face of the inner wall 22 forms the through hole 20. A threaded part is formed on an outer face of the outer wall 24. A diameter-enlarged cylinder 25 is hanging from a lower end of the outer wall 24 via an outward flange **25*a*. As shown in FIG. 1, a longitudinal cylinder 33 for locking the link cylinder 10 is hanging from a joint between the lower end of the outer cylinder 24 and the outward flange 25*a*. The structure of the longitudinal cylinder 33 will be described below. The outer wall 24, the outward flange 25*a* and the diameter-enlarged cylinder 25 have a predetermined thickness to ensure a required strength, since these parts form the outline of the cover ring. On the other hand, the longitudinal cylinder 33 is thin in comparison with the outer wall 24, so that it can be elastically opened if the link cylinder 10 is inserted. The cylinder length of the longitudinal cylinder 33 is preferably equal to or less than that of the diameter-enlarged cylinder 25**.

Figure 7:
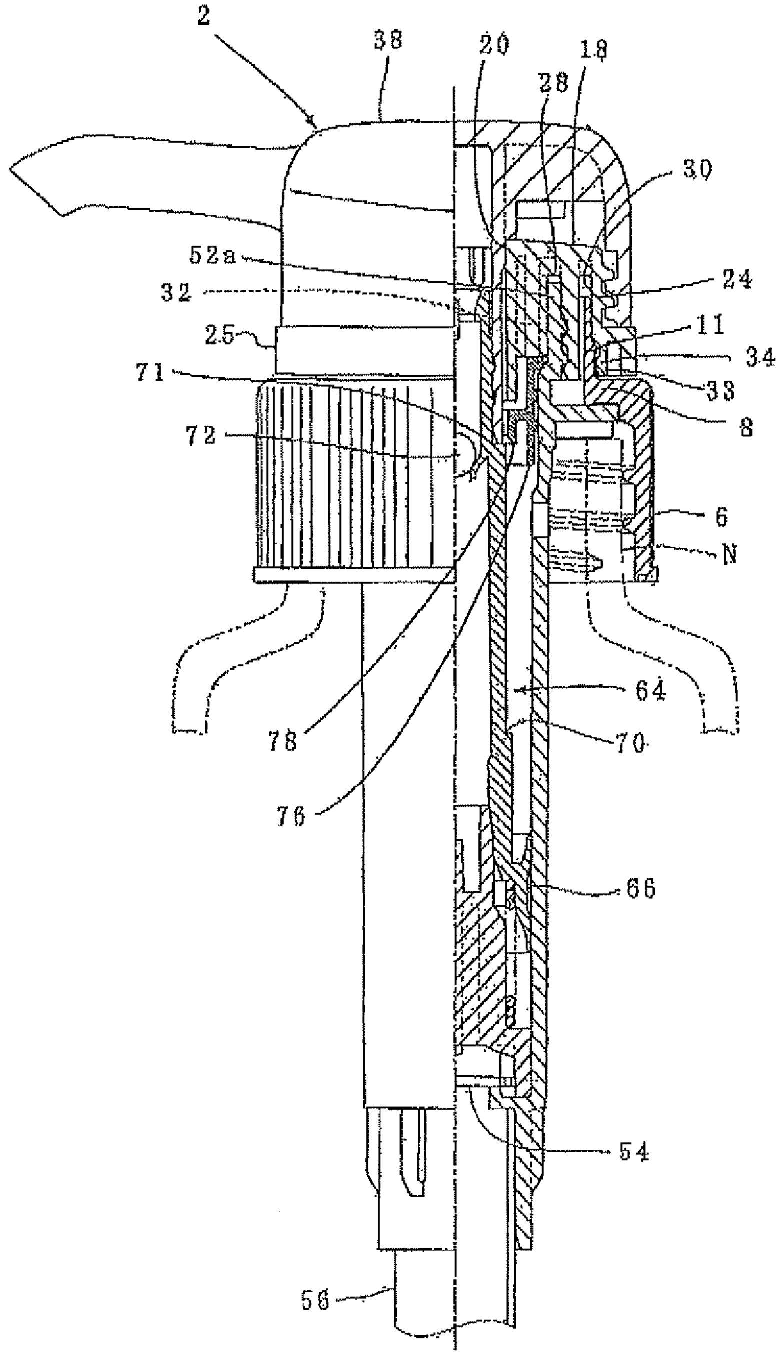
FIG. 7 is a longitudinal sectional view of a discharge pump consisting of a combination of the head part module in FIG. 1 and the pump part module in FIG. 6.

As shown in FIG. 7, a first fitting strip 28 in a form of an inner groove for attaching an upper end of the pump part module and a second fitting strip 30 in a form of an outer groove for linking with the mounting cap are provided circumferentially on the rear face side of the top plate 18 of the cover ring 16. In the shown example, the cylindrical additional wall 32 is hanging from a part close to the inner wall 22 on the rear face of the top plate 18 and a middle wall 26 is hanging from a part close to the outer wall 24 on the rear face of the top plate 18. The first fitting strip 28 is formed in a space between the outer face of the additional wall 32 and the inner face of the middle wall 26, and the second fitting strip 30 is formed in a space between the outer face of the middle wall 26 and the inner faces of the outer wall and the longitudinal cylinder. However the structure can be modified appropriately. The middle wall 26 clamps an upper end **52*a* of a pump cylinder of the pump part module with the additional wall 32. However, the middle wall can be omitted and, for example, the first fitting strip 28 can be formed on an outer face of the additional wall 32 and the second fitting strip 30 can be formed on the inner face of the outer wall 24 and the longitudinal cylinder 33**.

The link cylinder 10 of the mounting cap 6 is rotatably fitted into the second fitting strip 30. Since a close fit which is, for example, provided on the upper end of the pump cylinder is not necessary for the link cylinder, the link cylinder is inserted into the second fitting strip 30 only by a loose fit. In other words, the link cylinder 10 is loosely fitted onto one of the inner face or outer face (the outer face in the shown example) of the second fitting strip 30, and a gap is provided between the other face and the link cylinder 10, so that frictional resistance during rotating the mounting cylinder 6 relative to the cover ring 16 is small. In the preferred embodiment, an annular concave 35 is formed on the inner face of the longitudinal cylinder 33 below the lower end of the outer wall 24 to circumferentially provide a convex second engagement strip 34. A first engagement strip 11 is arranged in the concave 35 such that it can be rotated and moved up and down. The lower face of the first engagement strip 11 rests on the second engagement strip 34 to prevent disengagement of the link cylinder 10 from the second fitting strip. However, it is also possible to form the first engagement strip on the inner face of the link cylinder 10 and the second engagement strip on the outer face of the middle wall 26 (inner face of the second fitting strip 30), respectively.

Push down head 37 has an outer cylinder 40 hanging from an outer circumference of a top plate 38 and a first communication tube 42 hanging from a rear face of the top plate above the through hole, respectively, as well as a nozzle 44 forwardly projecting from a front wall of the outer cylinder 40 and communicated with the first communication tube 42. The lower part of the outer cylinder 40 is threaded with the outer face of the outer wall 24 of the cover ring 16. The downwardly projecting first communication tube 42 is fluid-tightly and slidably fitted into the through hole 20.

In the above embodiment, the mounting cap 4 is linked with the cover ring 16 via the link cylinder 10, and the cover ring 16 is fitted into the push down head 37 in the state shown in FIG. 1 such that these parts can be treaded as a integral unit.

Figure 6:
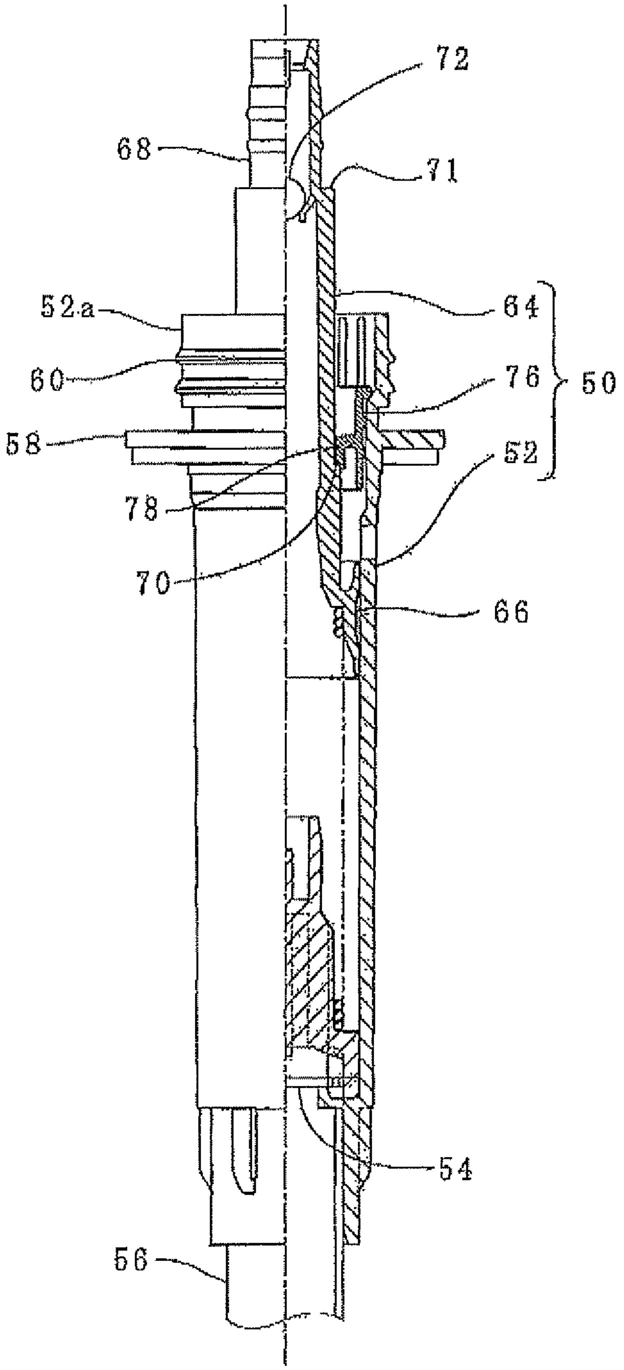
FIG. 6 is a longitudinal sectional view of a pump part module according to an embodiment.

The structure of the pump part module is shown in FIG. 6. The pump part module 50 comprises a pump cylinder 52, a tubular member 64 and a retaining means 76.

The pump cylinder 52 has a suction tube 56 hanging from a lower end of the pump cylinder 52 and a collar 58 outwardly projecting from an upper part of the outer face of the pump cylinder for locking engagement with the upper end face of the neck portion of the container body. The upper end part 52*a* of the pump cylinder extends into the fitting part above the collar 58 as a fitting cylinder. A contact rib 60 is circumferentially provided on the outer face of the upper end part of the pump cylinder for pressure contact with a lower half 26*a* of the middle wall 26. A packing is arranged on the lower face of the collar 58 to form a sealing contact with the upper end part of the neck portion of the container body.

The tubular member 64 has a second communication tube 68 serving also as a stem and upwardly extending from a cylindrical piston 66. A spring is disposed between the piston 66 and the bottom part of the pump cylinder 52. A first upward step 70 and a second upward step 71 are provided circumferentially on a lower middle part of the second communication tube 68 and on the outer face of the upper part of the second communication tube 68, respectively. A discharge valve 72 is formed on an upper part of the second communication tube 68 The discharge valve in the shown example is a ball valve and is formed such that it moves between the valve seat and the traverse rib circumferentially provided on the inner face of the upper end of the tubular member 64.

In the present embodiment, the retaining means 76 is a retaining cylinder and comprises a locking piece 78 having a reverse L-shaped cross section projecting from the inner face of the cylinder body which is fitted onto the inner face of the upper part of the pump cylinder. The locking piece 78 is locked on the first upward step 70 of the tubular member 64, as shown in FIG. 6.

In the above embodiment, the retaining member 76 prevents the tubular member 64 from being removed against spring force to modularize the pump cylinder 52 and the tubular member 64. Function of the pump can be checked in this modularized state.

FIG. 7 shows the discharge pump formed by a head part module and a pump part module.

If the lower face of the head part module 2 in FIG. 1 is joined with the upper part of the pump part module 50 in FIG. 6 and the head part module 2 is pushed down, the first communication tube 42 is firstly fitted onto the outer face of the second communication tube 68 and contacted with the second upward step 71. If the head part module 2 is further pushed down, the tubular member 64 is moved down within the pump cylinder 52, so that the upper end part 25*a* of the pump cylinder 52 is pressed into the first fitting strip 28 and fitted therein. The discharge pump is thus completed.

In order to mount the discharge pump on the container body, the mounting cylinder 6 is threaded onto the outer face of the neck portion N of the container body, as shown in an imaginary line in FIG. 7. The link cylinder 10 of the mounting cap 4 can be rotated relative to the cover ring 16 and moved up and down to a certain extent, so that only the mounting cylinder 6 can be freely rotated and threaded onto the neck portion N while the cover ring 16 and the mounting cylinder 6 are linked. After a completion of the threaded engagement, the pump cylinder 52 can be supported on the container body in such a manner that the collar 58 is clamped between the upper end face of the neck portion N and the inward flange 8 of the mounting cylinder 6.

Figure 8:
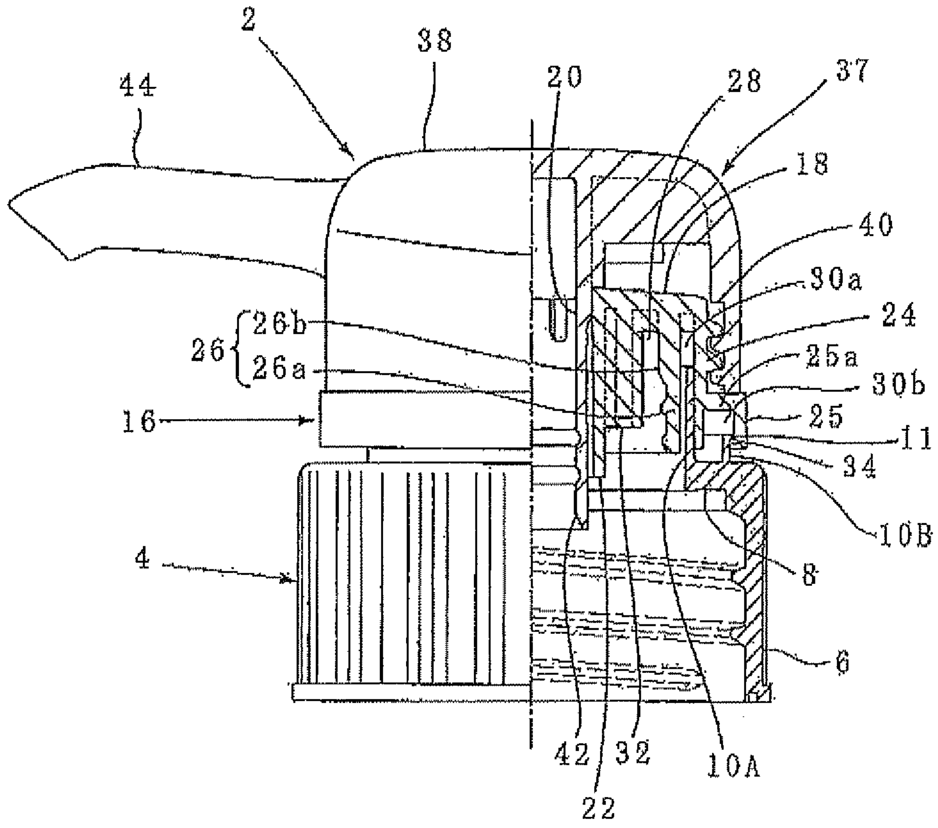
FIG. 8 is a longitudinal sectional view of the head part module according to the second embodiment of the invention.
Figure 9:
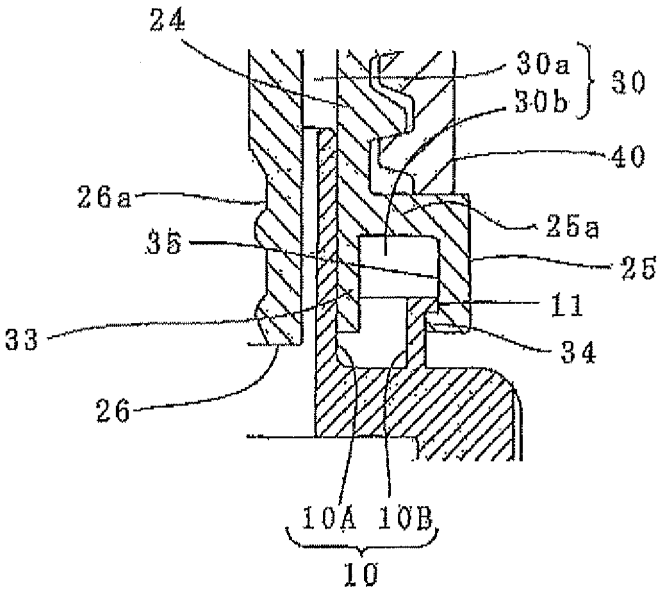
FIG. 9 is a partially enlarged view of the head part module in FIG. 8.

FIGS. 8 and 9 show the head part module 2 according to the second embodiment of the present invention. The description of the same structure as the first embodiment is omitted. In this embodiment, the second fitting strip 30 as a fitting groove is formed between the outer face of the middle wall 26 and the inner face of the outer wall 24 as well as the diameter-enlarged cylinder 25. In the shown example, the second fitting strip 30 is divided into an inner groove section 30*a* and an outer groove section 30*b* by the longitudinal cylinder 33 hanging from the lower end of the outer wall 24. In the present embodiment, the link cylinder 10 is formed by an inner cylinder 10A and an outer cylinder 10B upwardly extending from the outer face of the inward flange 8, respectively. A first engagement strip 11 and a second engagement strip 34 are provided circumferentially on the outer face of the upper part of the outer cylinder 10B and inner face of the lower part of the diameter-enlarged cylinder 25, respectively, so that this engagement of the both engagement strips prevents disengagement of the link cylinder 10 from the second fitting strip. A concave 35 is formed between the second engagement strip 34 and the outer flange 25*a*, so that the first engagement strip 11 can move up and down within the concave 35.

Figure 10:
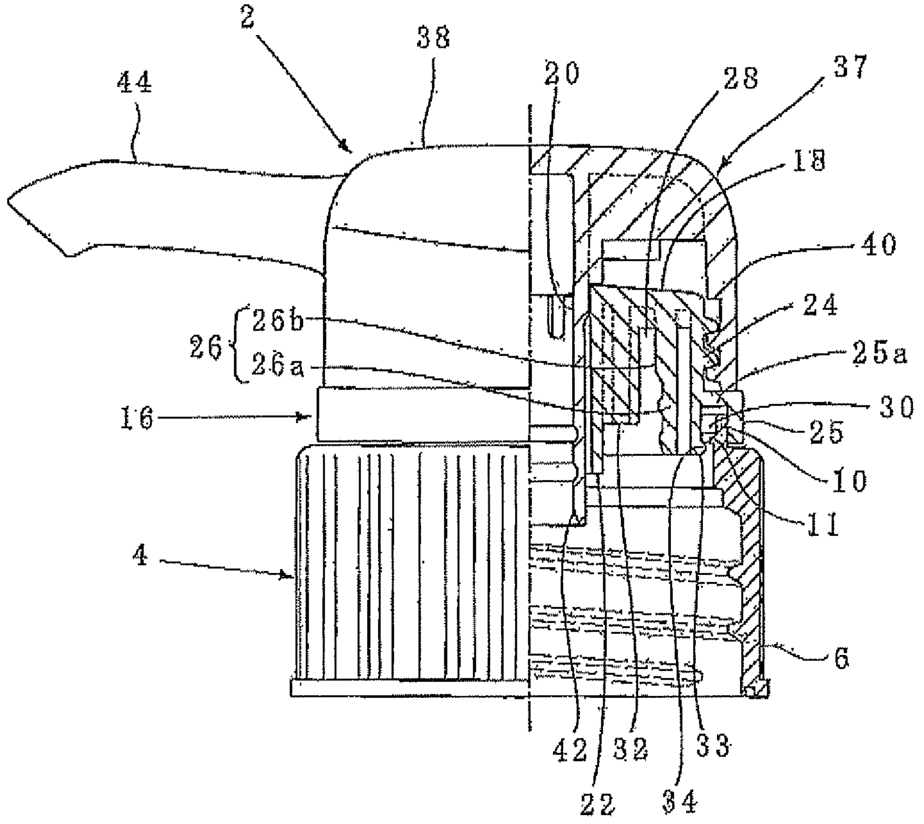
FIG. 10 is a longitudinal sectional view of the head part module according to the third embodiment of the invention.
Figure 11:
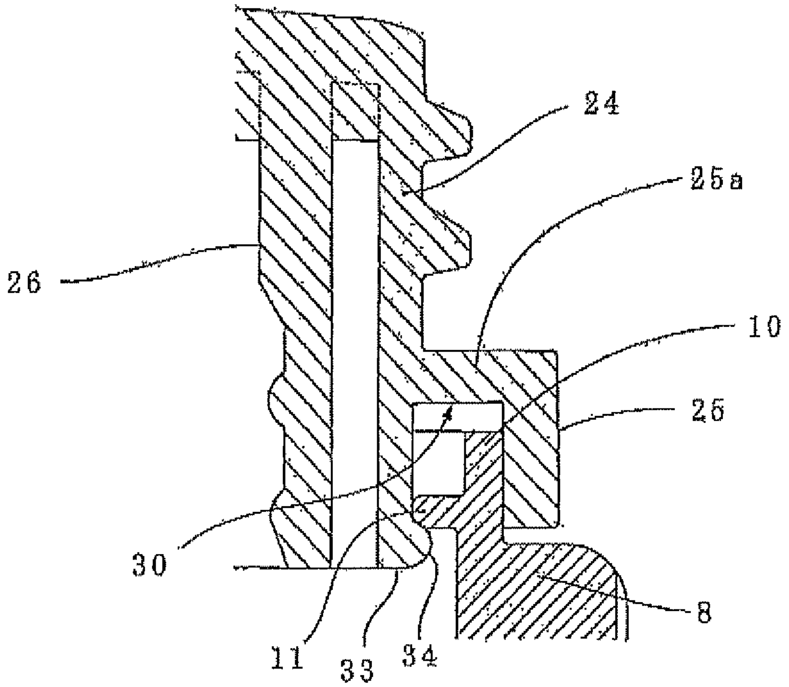
FIG. 11 is a partially enlarged view of the head part module in FIG. 10.

FIGS. 10 and 11 show the head part module 2 according to the third embodiment of the present invention. In this embodiment, the second fitting strip 30 is formed between the longitudinal cylinder 33 hanging from the lower end of the outer wall 24 and the diameter-enlarged cylinder 25 hanging from the lower end of the outer wall 24 via the outward flange 25*a*, as shown in FIG. 11. The inward flange 8 is short in comparison with that of the first embodiment, so that the link cylinder 10 upwardly extending from the circumference of the inward flange is inserted into the second fitting strip 30. The second convex engagement strip 34 is circumferentially provided on the lower part of the outer face of the longitudinal cylinder 33 and a first convex engagement strip 11 is provided on the lower part of the inner face of the link cylinder 10, so that it can be locked on the second engagement strip 34. In the shown embodiment, a gap is preferably provided between the upper end of the link cylinder 10 and the lower face of the outward flange 25*a* as well as between the lower end of the diameter-enlarged cylinder 25 and the upper face of the mounting cap 4, respectively, in an engaged state. The outer face of the link cylinder 10 is rotatably contacted with the inner face of the diameter-enlarged cylinder 25.

In the present embodiment, the second fitting strip 30 as a fitting groove is formed beneath the outer wall 24. While the fitting groove should not be as deep as that of the first embodiment, it is sufficient if the link cylinder 10 is loosely linked with the cover ring 16 in a manner that the cover ring 16 is not disengaged from the mounting cap 4. The function of the link cylinder 10 can be also achieved in this embodiment, The link cylinder 10 is preferably clamped between the longitudinal cylinder 33 and the diameter-enlarged cylinder 25, so that it is not disengaged from the fitting strip groove.

Figure 12:
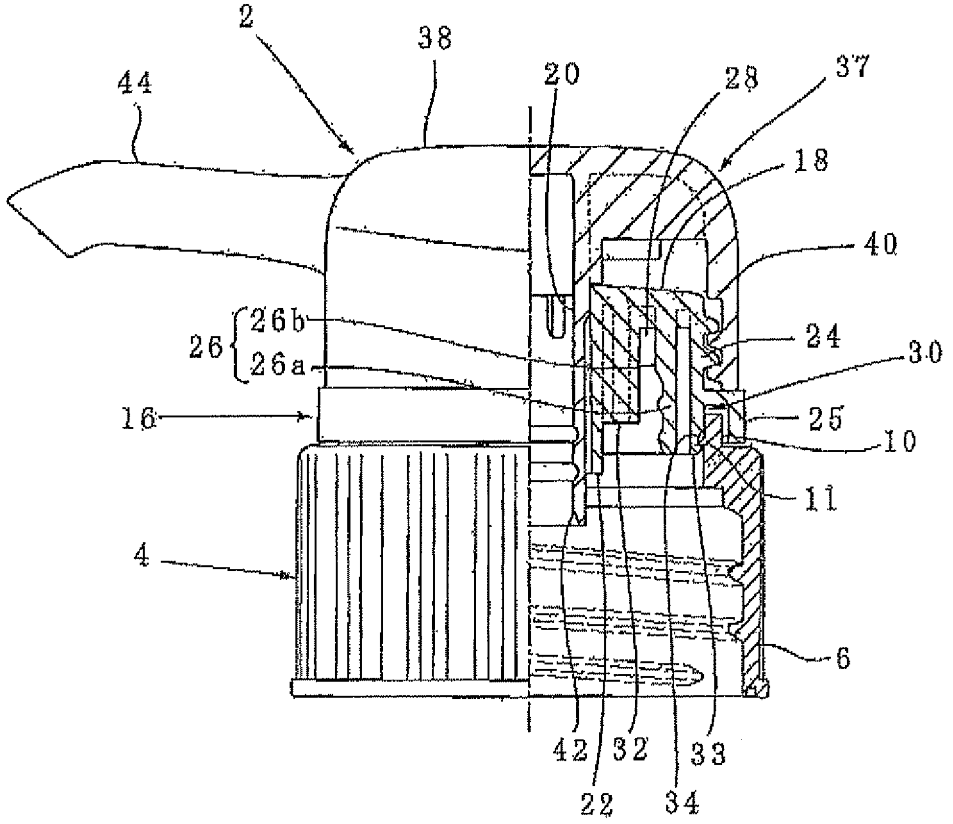
FIG. 12 is a longitudinal sectional view of the head part module according to the fourth embodiment of the invention.
Figure 13:
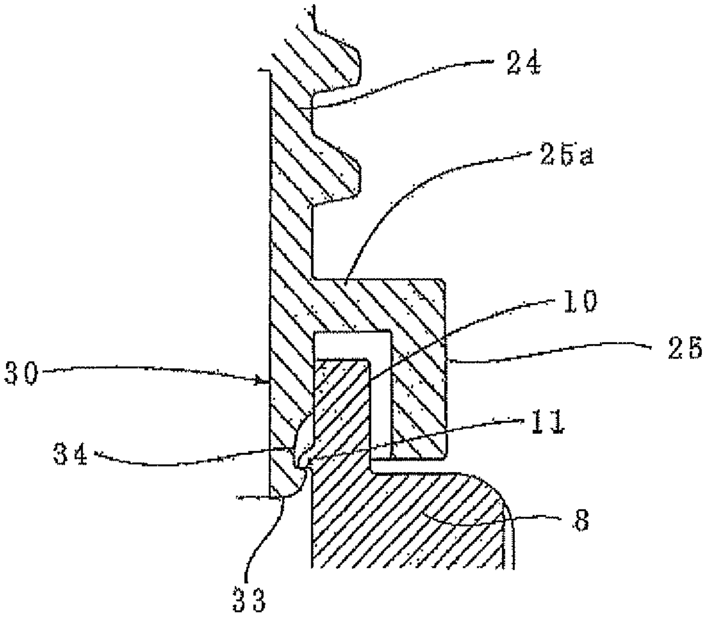
FIG. 13 is a partially enlarged view of the head part module in FIG. 12.

FIGS. 12 and 13 show the head part module 2 according to the forth embodiment of the present invention. In this embodiment, the second fitting strip 30 is formed as a downward convex fitting strip. In the shown example, the longitudinal cylinder 33 is hanging from the lower end of the outer wall 24, thereby forming a second fitting strip. The link cylinder 10 upwardly extending from the inner face of the inward flange is contacted with the outer face of the longitudinal cylinder 33 in such a manner that the link cylinder 10 can be rotated and moved up and down. The second engagement strip 34 as a concave strip is circumferentially provided on the lower part of the outer face of the longitudinal cylinder 33 and the first engagement strip 11 as a convex strip provided on the lower part of the link cylinder 10 is inserted into the concave strip in such a manner that it can be moved up and down. The second engagement strip 34 has a flat locking end face on the lower end, so that the mounting cap can be securely locked. Unlike the shown example, the second fitting strip 30 can be formed by the diameter-enlarged cylinder 25 hanging from the outer wall 24 via the outward flange 25*a* and the link cylinder 10 can be engaged with the inner face of the diameter-enlarged cylinder 25.

In this embodiment, the link cylinder 10 is supported by the longitudinal cylinder 33 hanging from the outer wall. To this end, the longitudinal cylinder 33 is preferably formed thick enough to securely lock the link cylinder 10.

Figure 14:
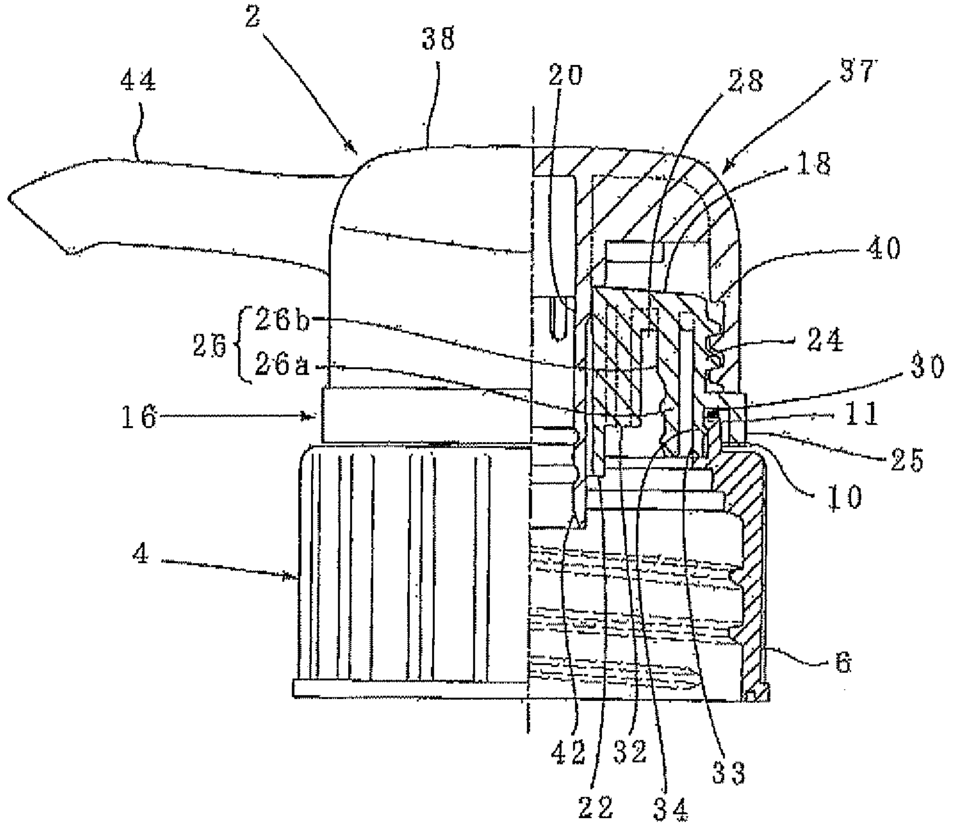
FIG. 14 is a longitudinal sectional view of the head part module according to the fifth embodiment of the present invention.
Figure 15:
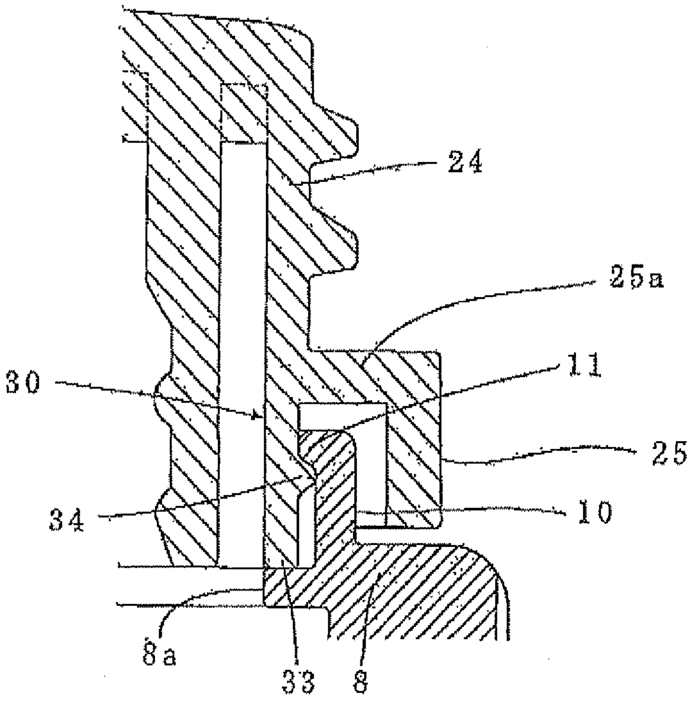
FIG. 15 is a partially enlarged view of the head part module in FIG. 14.

FIGS. 14 and 15 show the head part module 2 according to the fifth embodiment of the present invention. This embodiment is a variant of the fourth embodiment, and the first engagement strip 11 and the second engagement strip 34 are provided circumferentially on the inner face of the link cylinder 10 and the outer face of the longitudinal cylinder 33, respectively, so that the first engagement strip 11 comes into locking engagement with the second engagement strip 34. The inward flange 8 extends inwardly from a position where an upwardly extended part of the link cylinder 10 starts, and is formed in such a manner that the lower end face of the longitudinal cylinder 33 can be contacted with an extended part 8*a* of the inward flange 8.

REFERENCE SYMBOLS

2 head part module
4 mounting cap
6 mounting cylinder
8 inward flange
8*a* extended part
10 link cylinder
10A inner cylinder
10B outer cylinder
11 first engagement strip
16 cover ring
18 top plate
20 through hole
22 inner wall
24 outer wall
25 diameter enlarged cylinder
25*a* outward flange
26 middle wall
26*a* lower half of middle wall
26*b* upper half of middle wall
28 first fitting strip
30 second fitting strip
30*a* inner groove section
30*b* outer groove section
32 additional wall
33 longitudinal wall
34 second engagement strip
35 concave
37 push down head
38 top plate
40 outer cylinder
42 first communication tube
44 nozzle
50 pump part module
52 pump cylinder
52*a* upper end of pump cylinder
54 suction valve
56 suction tube
58 collar
60 contact rib
64 tubular member
66 piston
68 second communication tube
70 first upward step
71 second upward step
72 discharge valve
76 retaining means
78 locking piece

The invention claimed is:

1. A head part module formed, together with a pump part module for mounting on a container body, of a discharge pump for a discharge container, each of the head part module and the pump part module being configured as a detachable and separate structural unit, the head part module comprising:

a mounting cap having a link cylinder upwardly extending from an upper end of a mounting cylinder via an inward flange for fitting onto an outer face of a neck portion of the container body;

a cover ring having a top plate with a through hole in the middle part thereof, an outer wall hanging from an outer circumference of the top plate and an internal first fitting strip as well as an external second fitting strip circumferentially provided on the rear face of the top plate, the link cylinder being rotatably fitted into the second fitting strip; and a push down head having an outer cylinder hanging from an outer circumference of a top plate, a first communication tube hanging from a rear face of the top plate above the through hole and a nozzle forwardly projecting from the outer cylinder, the outer cylinder being detachably fitted onto an outer face of the outer wall;

wherein the first fitting strip of the cover ring can be fitted onto an upper end of a pump cylinder of the pump part module and the first communication tube of the push down head is fitted onto a second communication tube serving also as a stem of the pump part module, respectively, by pushing down the head part module.

2. The head part module according to claim 1, wherein the first fitting strip and the second fitting strip are formed as inner and outer fitting strip grooves divided by a middle wall hanging from the rear face of the top plate, and a second engagement strip and a first engagement strip are circumferentially provided on opposing circumferential faces of the second fitting strip and the link cylinder to prevent removal of the link cylinder by a mutual engagement.

3. The head part module according to claim 2, wherein a longitudinal cylinder with a larger inner diameter than that of the outer wall is hanging from a lower end of the outer wall and a second fitting strip is defined by respective inner faces of the outer wall and the longitudinal cylinder as well as an outer face of the middle wall, and an upper part of the link cylinder is fitted onto the inner face of the outer wall in a manner such that the upper part of the link cylinder slides in a circumferential direction, and the second engagement strip and the first engagement strip are formed on a lower part of the link cylinder and the longitudinal cylinder, so that the second engagement strip and the first engagement strip can engage with each other for locking the link cylinder.

4. The head part module according to claim 2, wherein a diameter-enlarged cylinder is hanging from the lower end of the outer wall via an outward flange; the second fitting strip is defined by respective inner faces of the outer wall and the diameter-enlarged cylinder as well as the outer face of the middle wall; the link cylinder is formed as a double cylinder comprising an inner cylinder fitted onto the inner face of the outer wall and an outer cylinder fitted onto the inner face of the diameter-enlarged cylinder; and the second engagement strip and the first engagement strip are formed on the outer cylinder and the diameter-enlarged cylinder, respectively, so that the second engagement strip and the first engagement strip can engage with each other to lock the link cylinder.

5. The head part module according to claim 1, wherein a double cylinder with an inner cylinder and an outer cylinder is hanging from the lower part of the outer wall of the cover ring, and the second fitting strip is formed in the double cylinder as a fitting groove defined by the inner faces of the double cylinder instead of being formed on the rear face of the top plate of the cover ring.

6. The head part module according to claim 1, wherein the second fitting strip is formed as a fitting convex strip downwardly extending from the lower part of the outer wall instead of being formed on the rear face of the top plate of the cover ring.

7. A discharge pump comprising a pump part module for mounting on a container body and a head part module according to claim 1, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

8. A discharge pump comprising a pump part module for mounting on a container body and a head part module according to claim 2, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

9. A discharge pump comprising a pump part module for mounting on a container body and a head part module according to claim 3, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

10. A discharge pump comprising a pump part module for mounting on a container body and a head part module according to claim 4, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

11. A discharge pump comprising a pump part module for mounting on a container body and a head part module according to claim 5, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

12. A discharge pump comprising a pump part module for mounting on a container body and a head part module according to claim 6, said each of the head part module and the pump part module being configured as a detachable and separate structural unit, the pump part module comprising:

a pump cylinder having a collar projecting from an outer face of an upper part of a circumferential wall for inserting into the container body;

a tubular member having a second communication tube serving also as a stem of the pump part module and upwardly extending from a cylindrical piston sliding within the pump cylinder;

a suction valve formed on a lower part of the pump cylinder; and a discharge valve formed on an upper part of the second communication tube;

wherein a cylindrical wall part adjacent above the collar and an upper end of the second communication tube are formed substantially cylindrical as an insertion area into the head part module, so that the piston is not removed from the pump cylinder and pumping function is fulfilled by the module alone.

* * * * *